(12) United States Patent
Karlin et al.

(10) Patent No.: US 7,007,610 B2
(45) Date of Patent: Mar. 7, 2006

(54) INFLATOR

(75) Inventors: Mats Karlin, Vargarda (SE); Stefan Svedjenas, Alingsas (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/645,355

(22) Filed: Aug. 21, 2003

(65) Prior Publication Data

US 2004/0069178 A1   Apr. 15, 2004

(30) Foreign Application Priority Data

Aug. 23, 2002 (GB) .................................. 0219734

(51) Int. Cl.
  *B60R 21/26*   (2006.01)
(52) U.S. Cl. ...................... 102/531; 280/736; 280/740; 280/741; 280/742
(58) Field of Classification Search ........ 102/530–531; 280/736–737, 740–741
See application file for complete search history.

(56) References Cited

U.S. PATENT DOCUMENTS

| | | | | |
|---|---|---|---|---|
| 3,528,681 A | * | 9/1970 | Ekstrom | 280/737 |
| 3,567,245 A | * | 3/1971 | Ekstrom | 280/737 |
| 3,602,526 A | * | 8/1971 | Brawn | 280/737 |
| 4,068,862 A | * | 1/1978 | Ishi et al. | 280/740 |
| 4,178,017 A | * | 12/1979 | Ishi et al. | 280/740 |
| 5,031,932 A | * | 7/1991 | Frantom et al. | 280/741 |
| 5,275,433 A | * | 1/1994 | Klober et al. | 280/741 |
| 5,351,988 A | * | 10/1994 | Bishop et al. | 280/737 |
| 5,542,696 A | | 8/1996 | Steffens, Jr. et al. | |
| 5,564,742 A | * | 10/1996 | Clark et al. | 280/740 |
| 5,615,912 A | * | 4/1997 | O'Loughlin et al. | 102/531 |
| 5,660,412 A | * | 8/1997 | Renfroe et al. | 280/737 |
| 5,794,973 A | * | 8/1998 | O'Loughlin et al. | 102/531 |

(Continued)

FOREIGN PATENT DOCUMENTS

EP    0 742 125 A2 * 11/1996 .................. 102/531

(Continued)

*Primary Examiner*—Michael J. Carone
*Assistant Examiner*—James S. Bergin
(74) *Attorney, Agent, or Firm*—Madson & Metcalf

(57) ABSTRACT

An inflator (1) is disclosed for use in a safety device within a motor vehicle, for example, for inflating an air-bag. The inflator comprises at least one gas outlet (23) having an initial predetermined gas flow area. The or each gas outlet incorporates a deformable part (41) which is configured to deform, in response to a predetermined gas pressure, so as to increase the gas flow area of the gas outlet. The deformable part (41) may be surrounded by a slot (40) which initially constitutes the outlet. The deformable part includes a neck (42) which bends so that the deformable part (41) opens like a flap. The invention is particularly suited for incorporating in a hybrid multi-stage gas generator comprising two or more pyrotechnic charges that can be actuated in combination or independently. The variable-area gas flow outlet provides an arrangement to vary the cross-section or area of a gas flow passage in response to a high pressure of gas.

10 Claims, 4 Drawing Sheets

U.S. PATENT DOCUMENTS

| | | |
|---|---|---|
| 5,951,040 A | 9/1999 | McFarland et al. |
| 5,984,352 A | 11/1999 | Green, Jr. et al. |
| 6,142,515 A | 11/2000 | Mika |
| 6,149,192 A * | 11/2000 | Swann et al. ............... 280/740 |
| 6,382,668 B1 | 5/2002 | Goetz |
| 6,412,811 B1 * | 7/2002 | Campbell et al. ........... 280/737 |
| 6,467,805 B1 * | 10/2002 | Schnowitz et al. ......... 280/740 |
| 6,557,890 B1 * | 5/2003 | Karlin et al. ................ 280/741 |
| 6,702,323 B1 * | 3/2004 | Goetz ........................ 280/736 |
| 6,786,507 B1 * | 9/2004 | Dolling et al. .............. 280/741 |
| 2001/0035637 A1 | 11/2001 | Thomas et al. |

FOREIGN PATENT DOCUMENTS

| WO | WO 00/46079 | 8/2000 |
|---|---|---|

\* cited by examiner

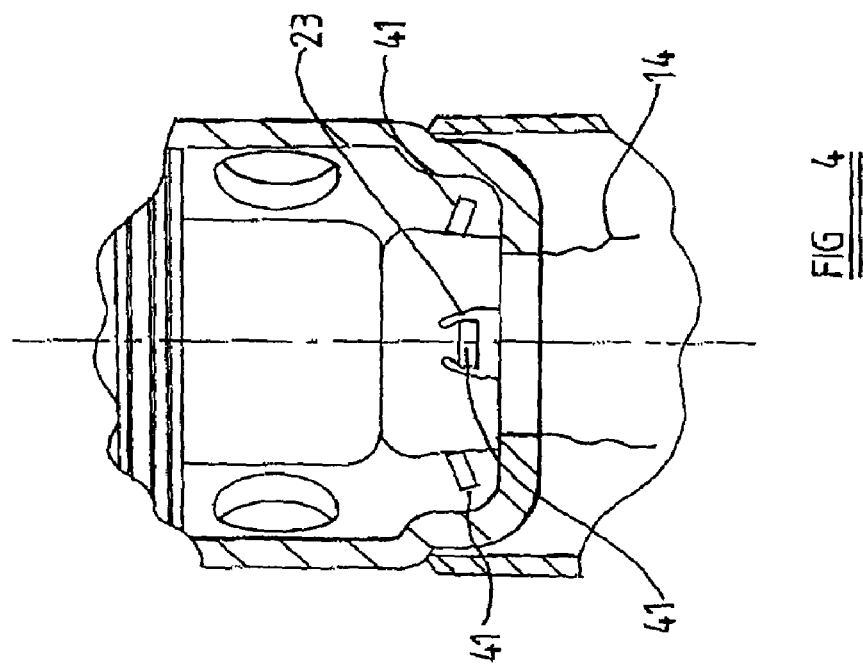
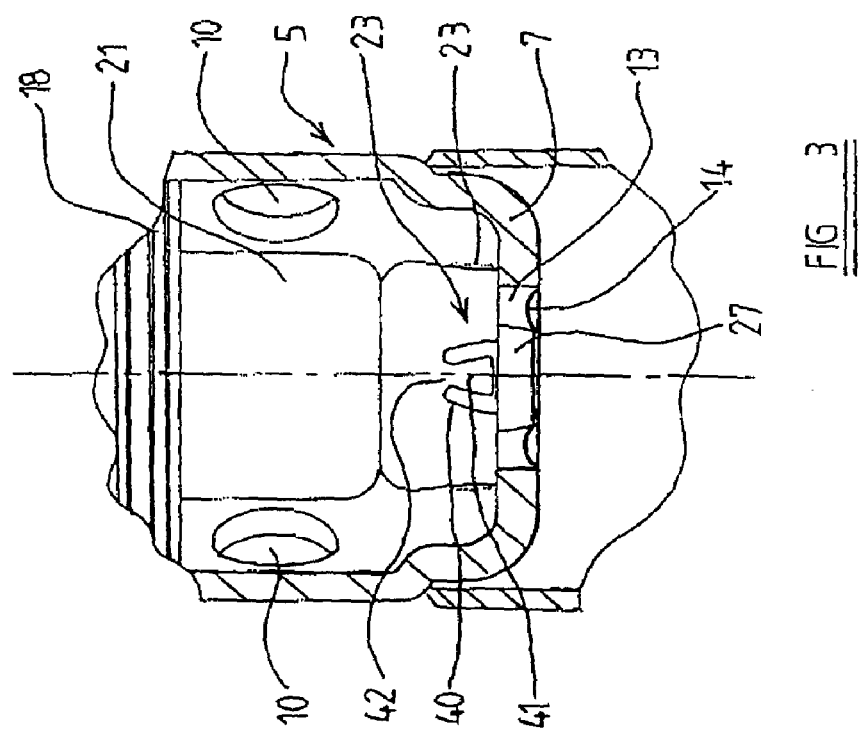

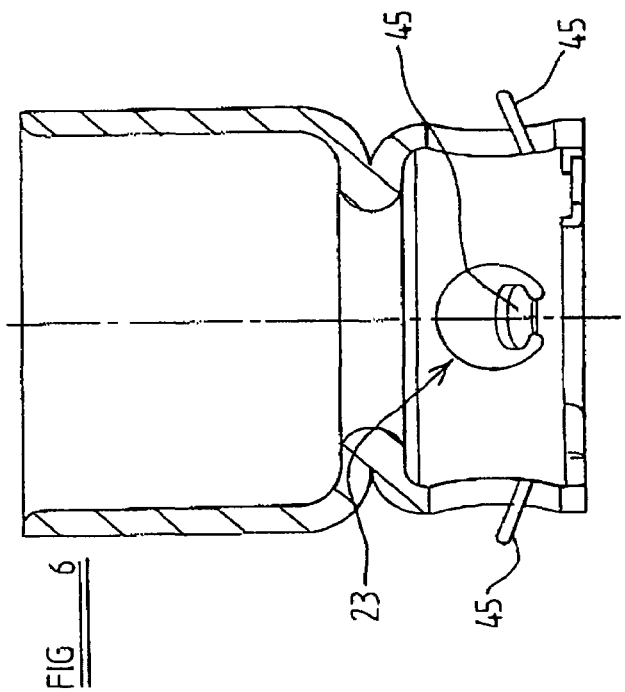
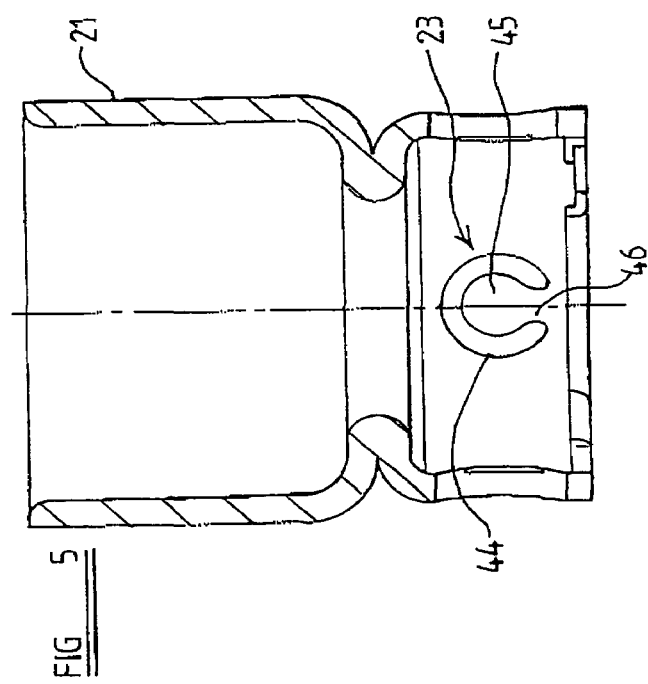
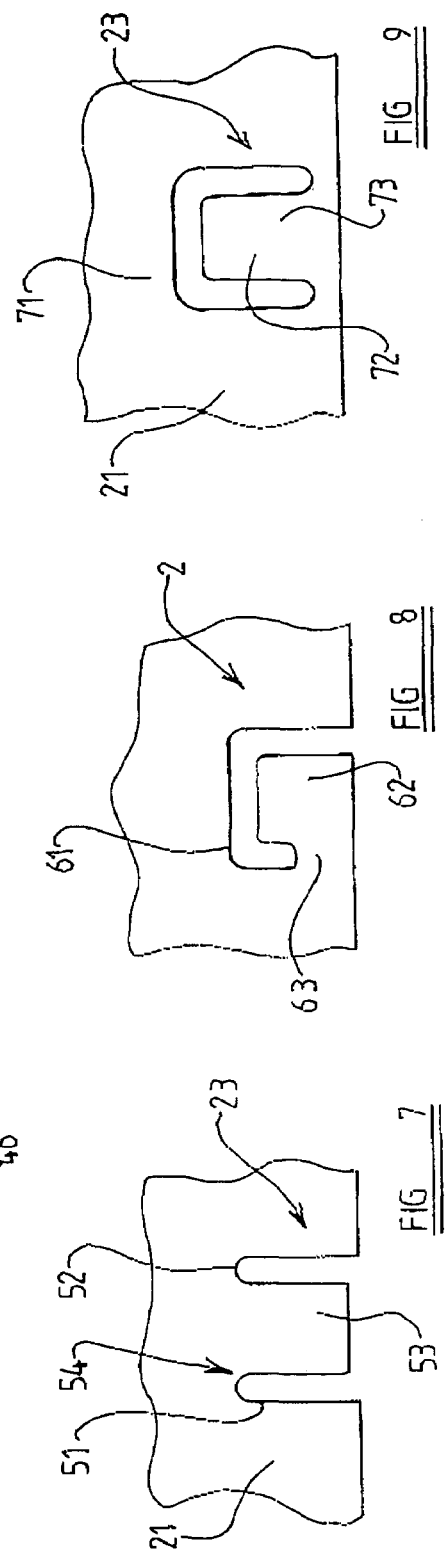

INFLATOR

BACKGROUND OF THE INVENTION

1. Field of the Invention

THE PRESENT INVENTION relates to an inflator and more particularly relates to an inflator for use in actuating and deploying a safety device, such as an air-bag, in a motor vehicle in the event that an accident should occur.

2. Description of Related Art

Many different types of inflator have been proposed previously for use in motor vehicles to actuate or deploy safety devices such as air-bags. In particular, it has been proposed to use gas generators which are termed "adaptive multi-stage inflators" which can be utilised to provide different inflationary effects in response to different types of crash or accident. In such an adaptive multi-stage inflator there may be two or more pyrotechnic charges that can be actuated in combination or independently. One pyrotechnic charge may be actuated before the other pyrotechnic charge, the delay before actuation of the second charge being 5 milliseconds or longer. A short delay may be appropriate for a very "hard" impact and a long delay may be more appropriate for a "light" impact. Many adaptive multi-stage inflators are of the "hybrid" type, meaning that the inflator has not only a pyrotechnic charge, but also a reservoir of compressed gas.

There are many important design parameters to take into account when designing an adaptive a multi-stage inflator, including the quantity, composition and configuration of the or each pyrotechnic charge, and the quantity, composition and pressure of the compressed gas if the gas generator is a hybrid gas generator. It is also necessary to provide an appropriate flow regulation for gas emerging from the inflator. Many pyrotechnic materials only provide an optimum "burn" characteristic when subjected to a back pressure and thus, in many cases, the flow of gas must be carefully regulated.

Thus, in some adaptive multi-stage inflators, where only a first pyrotechnic charge is to be actuated, the cross-section of the outlet flow path for gas can be relatively small, whereas if two or more pyrotechnic charges are actuated, the cross-section of the outlet flow path must be much greater. If two pyrotechnic charges are actuated within a relatively short period of time, the internal gas pressure may rise to very high levels, and if the cross-section of the outlet flow path is not appropriate, with regard to the quantity of gas being generated, then there is a risk that the parts of the inflator may be damaged.

SUMMARY OF THE INVENTION

The present invention seeks to provide an improved gas generator in which the risk of such explosion is minimised or obviated.

According to the present invention, there is provided an inflator for use in a safety device within a motor vehicle, the inflator comprising a hybrid multi-stage gas generator; the gas generator including a chamber accommodating compressed gas, a first pyrotechnic unit incorporating a first pyrotechnic charge configured so that, on actuation of the first pyrotechnic charge, hot gas from the pyrotechnic charge is directed into the chamber containing said compressed gas; and a second pyrotechnic unit incorporating a second pyrotechnic charge configured so that on actuation of the second pyrotechnic charge, hot gas from the second pyrotechnic charge is directed into the chamber containing the compressed gas; at least one gas outlet being located in a flow path from the chamber containing compressed gas to the exterior of the inflator, the gas outlet having an initial predetermined gas flow area, the gas outlet incorporating a deformable part configured to deform in response to a predetermined gas pressure, thereby increasing the gas flow area of the gas outlet.

Preferably the deformable part comprises a neck joining a tab or flap to a component of the inflator which defines the said gas outlet, the tab or flap being at least partially surrounded by one or more slots which define the initial gas flow area.

Advantageously the tab or flap is surrounded by a horse-shoe-shaped slot, the neck being defined between the ends of the slot.

Conveniently the tab or flap is of substantially square form.

Preferably the slot is of substantially "U"-shaped form.

Advantageously the slot comprises two parallel slot parts extending from a free end of the said component.

Conveniently the tab or flap is substantially triangular.

Preferably the deformable part of the or each gas outlet is plastically deformable.

Advantageously there are at least three said gas outlets.

Preferably the first pyrotechnic unit defines a chamber receiving a pyrotechnic charge, there being a gas flow path leading from that chamber to a plunger such that flow of gas from the chamber will cause the plunger to move, part of the plunger being located adjacent a rupturable foil which initially seals the chamber containing the compressed gas, such that movement of the plunger will rupture the foil, thus permitting compressed gas to flow through the aperture, the or each said gas outlet being provided in a guide tube for the plunger adjacent the said aperture.

In order that the invention may be more readily understood, and so that further features thereof may be appreciated, embodiments of the invention will now be described, by way of example, with reference to the accompanying drawings in which:

BRIEF DESCRIPTION OF THE DRAWINGS

FIG. 3 is an enlarged view of part of the inflator of FIG. 1 prior to deployment thereof, FIG. 4 is a view corresponding to FIG. 3 after deployment of the inflator, FIG. 5 is a view illustrating part of a modified inflator in accordance with the invention prior to deployment thereof, FIG. 6 is a view corresponding to FIG. 5 illustrating the said part of the inflator after deployment thereof, FIG. 7 is an enlarged view of part of another inflator in accordance with the invention, FIG. 8 is an enlarged view of part of yet another inflator in accordance with the invention, and FIG. 9 is an enlarged view of part of yet another inflator in accordance with the invention.

DETAILED DESCRIPTION OF THE INVENTION

Figure 1:
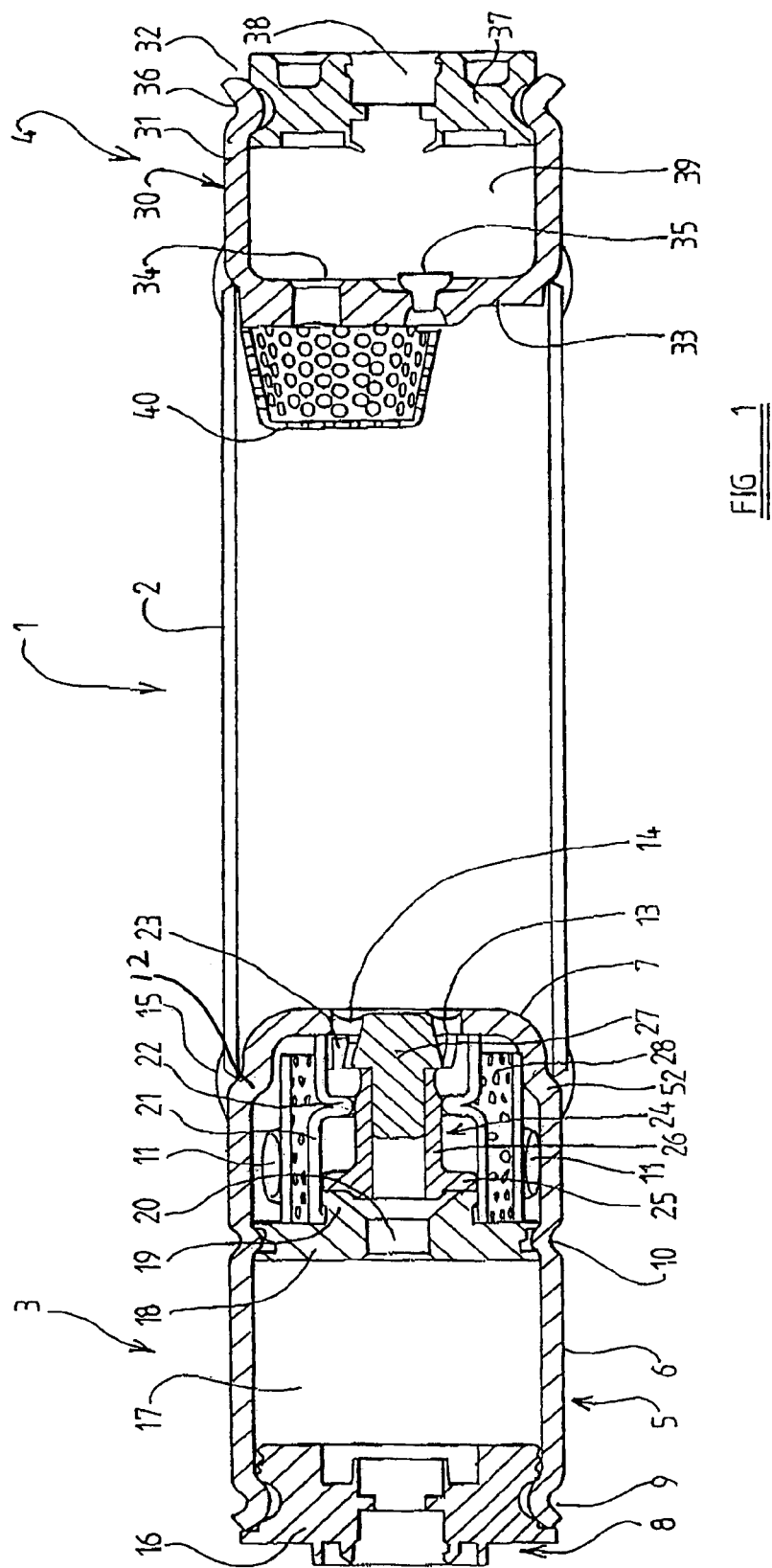
FIG. 1 is a diagrammatic sectional view of a hybrid adaptive multi-stage inflator in accordance with the invention, illustrated in an initial condition.

Referring initially to FIG. 1, a two-stage adaptive hybrid gas generator 1 is illustrated. The gas generator 1 comprises a main cylindrical housing 2. At one end the cylindrical housing 2 is closed by a first gas generator unit 3, and at the other end of the cylindrical housing is closed by a second gas generator unit 4.

The first gas generator unit 3 has a cup-shaped housing 5 having a cylindrical side wall 6, one end of which is closed to form a base 7, and the other end 8 of which is open. The side wall 6 adjacent the open end 8 is inwardly swaged at a first position 9 around the housing 5, and is also inwardly swaged at an intermediate position 10 around the housing, between the open end 8 and the base 7 at the closed end 6. Adjacent the intermediate swaging 10 is provided a plurality of gas outlet apertures 11 through the side wall 6. Adjacent the gas outlet apertures 11 the housing 5 has a discontinuity 12 where the diameter of the housing is slightly reduced. The base 7 is provided with a central aperture 13 which is initially sealed by means of a rupturable metallic foil 14.

The housing 5 is welded, by means of a weld 15, to the appropriate open end of the cylindrical housing 2 at a point adjacent the discontinuity 12.

The first swaging 9 adjacent the open end 8 of the cup-shaped housing 5 serves to retain a closure 16 in position. The closure 16 defines a seat which can accommodate a squib which, as will be described hereinafter, will be used to ignite a pyrotechnic charge. An internal chamber 17 is defined between the closure 15 and a locating plate 18 which is held in position by the intermediate swaging 10. Contained within the chamber 17, and held in position between the closure 15 and the locating plate 18 is a pyrotechnic charge.

The locating plate 18 is a generally planar plate having a protrusion 19 formed on the side thereof directed away from the pyrotechnic charge, the protrusion 19 being centrally located. A gas flow passage 20 extends through the locating plate 18 and the protrusion 19.

A guide tube 21 is provided having one end surrounding and engaging the projection 19 formed on the locating plate 18. The guide tube 21 extends from the locating plate 18 to the base 7 of the cup-shaped housing 5 and terminates adjacent the central aperture 13 formed therein. A central part of the guide tube 21 is radially inwardly swaged 22. The end of the guide tube 21 adjacent the central aperture 13 is provided with a plurality of gas outlet apertures 23 which are gas flow ports of adjustable cross-section, as will be described hereinafter in greater detail.

Contained within the guide tube 21 is a plunger assembly 24 comprising a piston 25, the head of which is a sliding and substantially sealing fit within the part of the guide tube 21 extending between the projection 19 formed on the locating plate 18, and the radially inwardly directed swaging 22. The piston head is associated with a hollow piston stem 26 which extends through the radially inwardly directed swaging 22. The hollow piston stem 26 is sealed by means of a plug 27 which is a friction fit within the end of the piston stem 26 remote from the piston head. The plug 27 extends to the central aperture 13 and supports the foil 14 that initially seals the aperture 13.

An annular filter 28 surrounds the guide tube 21.

The second pyrotechnic unit 4 again comprises a cup-shaped housing 30 having a cylindrical side wall 31 which is open at a first end 32, and which is closed by a base 33 at the other end. The central part of the base 33 is provided with a burst disc 34, and also with a filling plug 35.

The end of the side walls 31, adjacent the open end 32 of the housing 30, are inwardly swaged 36 to retain a closure 37 in position. The closure 37 defines a seat 38 for accommodating a squib. A chamber 39 is defined between the closure 37 and the base 33 of the housing 30 to contain a pyrotechnic charge.

A perforated guard 40 is provided which is mounted on the exterior part of the base 33 of the housing 30 to surround the burst disc 34.

The housing 30 is welded to the end of the cylindrical housing 2 opposed to the end on which the first pyrotechnic 3 is mounted.

When the various housings described above have been assembled together, initially a mixture of inert gas, such as, for example, 95% argon and 5% helium, is injected into the hollow interior of the cylindrical housing 2 through the filling plug 35 which is then closed. The pyrotechnic charges are located within the chambers 17, 39 of the respective pyrotechnic units 3, 4, and the respective closures 16, 37 are then located in position together with the appropriate squibs.

Figure 2:
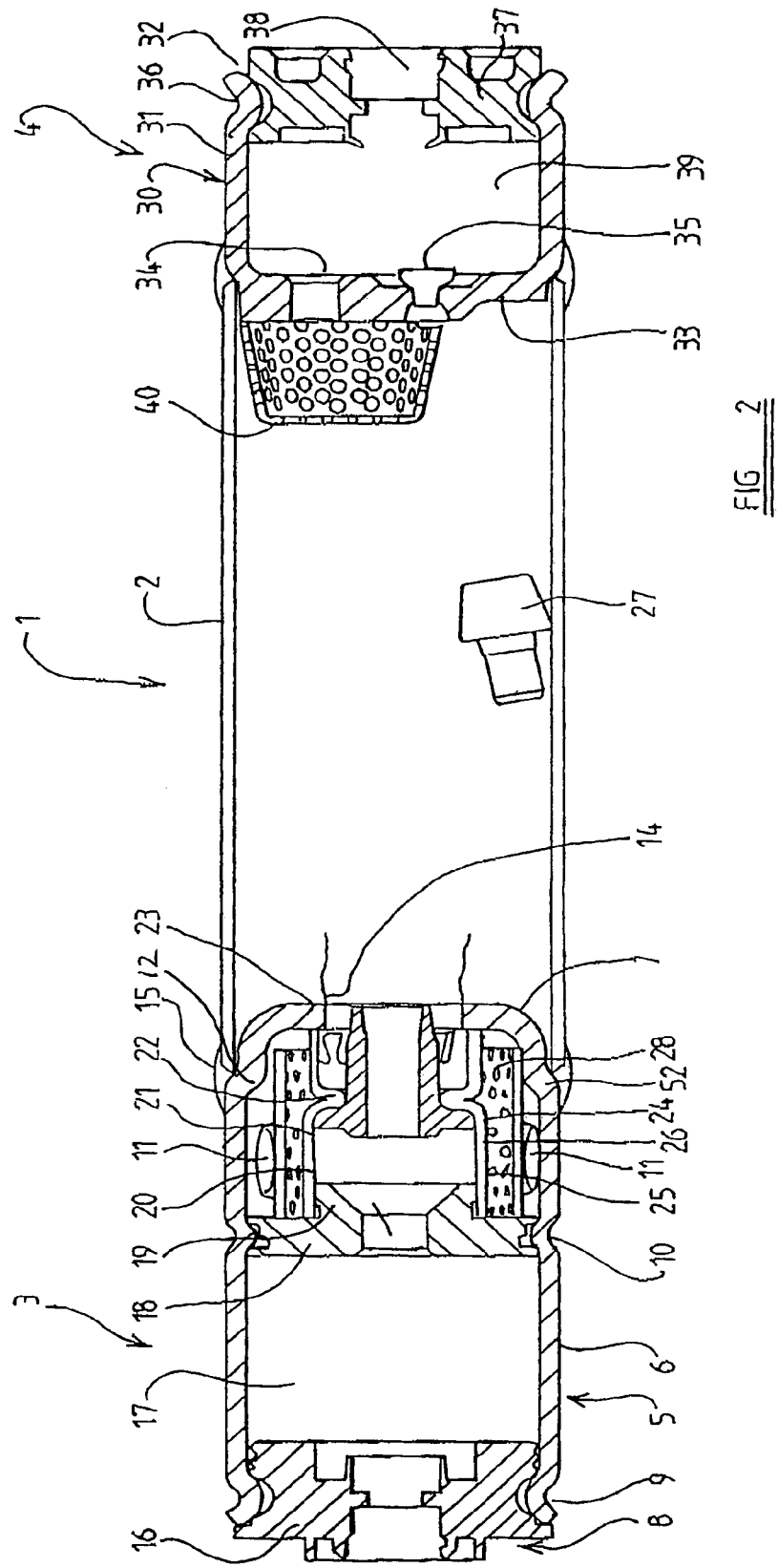
FIG. 2 is a view of the inflator of FIG. 1 after actuation of one stage thereof.

On actuation of the gas generator 1, initially the squib mounted in the closure 16 of the first pyrotechnic unit 3 will be actuated to ignite the pyrotechnic charge contained within the chamber 17. The resultant hot gas will flow through the central gas flow passage 20 provided through the locating plate 18 and the projection 19, and will act upon the plunger assembly 24. The gas will force the complete plunger assembly towards the right, as shown in FIG. 1. Thus the plug 27 will move to the right causing the foil 14 (initially supported by the plug 27) to rupture, thus opening the central aperture 13 formed in the base 7 of the cup-shaped housing 5 of the first pyrotechnic unit 3. The plunger assembly 24 will move to the right until the piston head engages the inwardly directed swaging 22 formed on the guide tube 21. The gas pressure within the chamber 17 will then continue to rise to such an extent that the plug 27 will become ejected from the hollow stem 26 of the piston 25 (FIG. 2). Gas is then directed from the chamber 17 through the hollow stem 26 of the piston 25 so that the gas from the chamber 17 is directed well into the chamber defined within the cylindrical housing 2 and becomes admixed with the mixture of inert gas within that chamber. The perforated burst disc guard 40 serves to prevent the burst disc 34 from being physically struck by the plug 27 as it is ejected from the piston stem 26, into the chamber defined within the cylindrical housing.

The mixture of "hot" gas from the chamber 17 and the "cold" gas initially contained within the housing 2, is allowed to flow towards the left through the central aperture 13 formed in the base 7 of the cup-shaped housing 5. The gas may flow through the gas outlet apertures 23, then flowing through the annular filter 28 before emerging through the apertures 11 formed in the side wall 6 of the housing 5.

If the second squib mounted on the closure 37 of the housing 30 of the second pyrotechnic unit 4 is actuated, hot gas will be generated within the chamber 39. That gas will cause the burst disc 34 to rupture so that the gas from the chamber 39 is also injected into the chamber defined within the cylindrical housing 2. If the gas pressure within the cylindrical chamber 2 rises to an undesirable extent, the configuration of the gas outlet apertures 23 formed in the end of the guide tube 21 adjacent the aperture 13 formed in the base 7 of the cup-shaped housing 5 will alter so that there is an increase in the available gas flow area, as will be described below in greater detail. Thus the risk of the gas generator or inflator being damaged is obviated or reduced.

FIG. 3 illustrates in greater detail the lower end of the guide tube 21 (the annular filter 28 has been removed for the purposes of clarity of illustration). The guide tube 21 extends from the locating plate 18 to the base 7 of the cup-shaped housing 5. The guide tube 21 is provided, at the end thereof adjacent the base 7 of the cup-shaped housing 5, with a plurality of radially disposed gas outlet apertures 23. The outlet apertures 23 are, as will now be described, of variable cross-section. Part of the plug 27 extends beyond the end of the guide tube 21 to support the foil 14 that initially seals the aperture 13.

Each outlet aperture 23 in the embodiment shown in FIG. 3 is formed by a slit 40 which extends partly along the edge of the free end of the guide tube 21, and which has two substantially axially extending, but slightly inwardly convergingly directed arms, the slit thus surrounding a generally triangular-shaped tab or flap 41. The slit 40 has a substantial cross-section so that the slit itself defines an aperture of a predetermined gas flow area, or gas flow cross-section.

The tab or flap 41 is formed integrally with the guide tube 21 and is joined to the rest of the guide tube 21 by a relatively narrow neck 42.

Should the pressure within the chamber of the cylindrical housing 2 rise above a predetermined acceptable pressure, the pressure will be such that the tab or flap 41 of each aperture 23 will be driven outwardly with a deformation of the neck 42. Each tab or flap 41 will then project outwardly, as shown in FIG. 4, thus substantially increasing the available gas flow cross-section. Thus, when the pressure rises to an unacceptable level, the apertures 23 automatically adjust so that the apertures are of increased size, helping obviate or minimise the risk of explosion of the inflator.

Whilst FIGS. 3 and 4 illustrate one embodiment of the invention, it is to be appreciated that many alternative designs for the automatically regulating gas flow apertures 23 may be produced. One alternative design is shown in FIG. 5, for example. In FIG. 5, a guide tube 21 is shown in which the outlet apertures 23 are each constituted by a "horseshoe" or crescent-shaped slot 44 which surrounds a tab or flap 45 having a part circular periphery and which is connected by means of a relatively narrow neck 46 to the rest of the guide tube 21. It is to be appreciated that for "ordinary" gas pressures within the inflator, gas will flow through the slot 44. However, if the pressure should rise to an unacceptable level, the tab or flap 45 will be driven outwardly, as shown in FIG. 6, so that the aperture 23 then has a much larger gas flow or cross-sectional area.

As can be understood from FIGS. 3 and 4 and from FIGS. 5 and 6, in these illustrated embodiments the guide tube is provided with four equi-spaced variable outlet apertures 23. It is preferred that at least three variable apertures are provided, although five or more may also be found to be suitable.

FIG. 7 illustrates a further design for a variable outlet aperture 23. The aperture, in this embodiment, comprises two totally separate parallel slits 51, 52, which extend axially inwards from the free end of the guide tube 21. The slits 51, 52 define between them a substantially square tab or flap 53 joined to the rest of the tube 21 by means of a "neck" 54 which extends between the ends of the slits 51, 52. Again, under ordinary circumstances, gas will flow through the slits 51, 52, but if a very high pressure is experienced, the tab or flap 53 will be driven outwardly, with a deformation of the neck 54, to increase the available flow area for gas.

FIG. 8 illustrates yet another embodiment in which a substantially "L"-shaped slot 61 is formed at the end of the guide tube 21 to form the variable gas outlet aperture 23. The slot 61 partially surrounds a tab or flap 62 which is connected to the rest of the tube 21 by means of a relatively narrow neck 63 extending from the end of the slot 61 to the adjacent end of the tube 21. Again, in this embodiment, under ordinary conditions gas will flow through the slot 61, whereas if a very high gas pressure is experienced, the tab or flap 62 will be deformed to extend outwardly, thus increasing the available flow area for the aperture 23.

Finally FIG. 9 illustrates yet another embodiment of the invention in which the variable aperture 23 is defined by a "U"-shaped slot 71 formed adjacent the end of the guide tube 21. The "U"-shaped slot 71 surrounds a substantially square tab or flap 72 which is joined to the rest of the tube 21 by means of a relatively narrow neck 73, the neck being parallel to and spaced slightly from the very end of the guide tube 21. Again, in this embodiment, under ordinary conditions gas will flow through the slot 71 whereas, should a very high gas pressure exist, the tab or flap 72 would be bent outwardly with a consequent deformation of the neck 73 thus increasing the available gas flow area.

It is to be appreciated that the variable outlet apertures described above are all formed integrally with the guide tube, without the requirement for any additional components. The variable apertures can thus be provided easily or cheaply. Each gas outlet aperture has an initial predetermined gas flow area, and incorporates a deformable part configured to deform in response to a predetermined high gas pressure, so as to increase the gas flow area of the gas outlet.

It is to be understood that the different shapes of aperture may vary the bending effect achieved. A horseshoe-shaped slot will provide a relatively narrow neck, meaning that the tab or flap defined by a horseshoe slot may bend much more easily than a tab or flap defined by two parallel slots. It is possible to treat the area defining the neck to facilitate bending, such as by reducing the thickness of the neck as compared with the thickness of the rest of the guide tube. If the guide tube is formed of metal, the necks may be plastically deformable or resiliently deformable.

In the present Specification "comprises" means "includes or consists of" and "comprising" means "including or consisting of".

What is claimed is:

1. An inflator for use in a safety device within a motor vehicle, the inflator comprising a hybrid multi-stage gas generator; the gas generator including a chamber accommodating compressed gas, a first pyrotechnic unit incorporating a first pyrotechnic charge configured so that, on actuation of the first pyrotechnic charge, hot gas from the pyrotechnic charge is directed into the chamber containing said compressed gas; and a second pyrotechnic unit incorporating a second pyrotechnic charge configured so that on actuation of the second pyrotechnic charge, hot gas from the second pyrotechnic charge is directed into the chamber containing the compressed gas; at least one gas outlet aperture being located in a flow path from the chamber containing compressed gas to the exterior of the inflator, the gas outlet aperture having an initial cross-section to define an initial gas flow area, the at least one gas outlet aperture incorporating a deformable part configured to deform in response to a predetermined gas pressure within the chamber, thereby increasing the cross-section of the gas outlet aperture to increase the gas flow area of the gas outlet.

2. An inflator according to claim 1 wherein the deformable part comprises a neck joining a tab or flap to a component of the inflator which defines the said gas outlet, the tab or flap being at least partially surrounded by one or more slots which defile the initial gas flow area.

3. An inflator according to claim 2 wherein the tab or flap is surrounded by a horseshoe-shaped slot, the neck being defined between the ends of the slot.

4. An inflator according to claim 2 wherein the tab or flap is of substantially square form.

5. An inflator according to claim 2 wherein the slot is of substantially "U"-shaped form.

6. An inflator according to claim 2 wherein the slot comprises two parallel slot parts extending from a free end of the said component.

7. An inflator according to claim 2 wherein the tab or flap is substantially triangular.

8. An inflator according to claim 1 wherein the deformable part of the at least one gas outlet is plastically deformable.

9. An inflator according to claim 1 wherein there are at least three said gas outlets.

10. An inflator according to claim 1 wherein the first pyrotechnic unit defines a chamber receiving a pyrotechnic charge, there being a gas flow path leading from that chamber to a plunger such that flow of gas from the chamber will cause the plunger to move, part of the plunger being located adjacent a rupturable foil which initially seals the chamber containing the compressed gas, such that movement of the plunger will rupture the foil, thus permitting compressed gas to flow through the aperture, the or each said gas outlet being provided in a guide tube for the plunger adjacent the said aperture.

* * * * *